(12) United States Patent
Muraoka et al.

(10) Patent No.: US 8,124,278 B2
(45) Date of Patent: Feb. 28, 2012

(54) NONAQUEOUS ELECTROLYTE SECONDARY BATTERY AND METHOD FOR MANUFACTURING ELECTRODE OF NONAQUEOUS ELECTROLYTE SECONDARY BATTERY

(75) Inventors: Yoshiyuki Muraoka, Osaka (JP); Takuji Hirano, Wakayama (JP); Shinji Kasamatsu, Osaka (JP); Miyuki Nakai, Osaka (JP)

(73) Assignee: Panasonic Corporation, Osaka (JP)

( * ) Notice: Subject to any disclaimer, the term of this patent is extended or adjusted under 35 U.S.C. 154(b) by 460 days.

(21) Appl. No.: 12/374,730

(22) PCT Filed: Jun. 12, 2008

(86) PCT No.: PCT/JP2008/001505
§ 371 (c)(1),
(2), (4) Date: Jan. 22, 2009

(87) PCT Pub. No.: WO2008/155885
PCT Pub. Date: Dec. 24, 2008

(65) Prior Publication Data
US 2009/0202907 A1 Aug. 13, 2009

(30) Foreign Application Priority Data
Jun. 18, 2007 (JP) .................................. 2007-159795

(51) Int. Cl.
*H01M 4/62* (2006.01)
*H01M 2/14* (2006.01)
*H01M 4/82* (2006.01)

(52) U.S. Cl. ........ 429/217; 429/246; 429/232; 429/209; 29/623.1; 29/623.5

(58) Field of Classification Search .................. 429/209, 429/217, 246, 232; 29/623.1, 623.5
See application file for complete search history.

(56) References Cited

U.S. PATENT DOCUMENTS

| | | | | |
|---|---|---|---|---|
| 5,631,100 | A * | 5/1997 | Yoshino et al. | 429/62 |
| 6,045,947 | A | 4/2000 | Shindo et al. | |
| 2002/0028380 | A1* | 3/2002 | Tanjo et al. | 429/209 |
| 2003/0035995 | A1* | 2/2003 | Ohsaki et al. | 429/217 |
| 2004/0234850 | A1* | 11/2004 | Watarai et al. | 429/217 |
| 2006/0024579 | A1* | 2/2006 | Kolosnitsyn et al. | 429/209 |
| 2006/0251965 | A1* | 11/2006 | Nagayama et al. | 429/209 |

FOREIGN PATENT DOCUMENTS

| | | | |
|---|---|---|---|
| JP | 63-121247 | * | 5/1988 |
| JP | 04-082156 | | 3/1992 |
| JP | 09-134718 | | 5/1997 |
| JP | 09-147834 | | 6/1997 |
| JP | 09-185960 | | 7/1997 |
| JP | 10-199574 | | 7/1998 |
| JP | 10-270013 | | 10/1998 |
| JP | 11-126600 | * | 5/1999 |
| JP | 2001-297763 | | 10/2001 |

* cited by examiner

*Primary Examiner* — Ula C Ruddock
*Assistant Examiner* — Amanda Barrow
(74) *Attorney, Agent, or Firm* — McDermott Will & Emery LLP

(57) ABSTRACT

A nonaqueous electrolyte secondary battery comprising a positive electrode 5, a negative electrode 6, a separator 7 and a nonaqueous electrolyte, wherein a material mixture layer containing an active material and a binder is formed on a surface of a current collector 51 of at least one of the positive electrode 5 and the negative electrode 6. The material mixture layer includes a first layer 52 and a second layer 53 which are different in volume ratio of the binder to the active material. The volume ratio (A) of the binder in the first layer 52 in contact with the surface of the current collector 51 is lower than the volume ratio (B) of the binder in the second layer 53.

5 Claims, 2 Drawing Sheets

NONAQUEOUS ELECTROLYTE SECONDARY BATTERY AND METHOD FOR MANUFACTURING ELECTRODE OF NONAQUEOUS ELECTROLYTE SECONDARY BATTERY

RELATED APPLICATIONS

This application is the U.S. National Phase under 35 U.S.C. §371 of International Application No. PCT/JP2008/001505, filed on Jun. 12, 2008, which in turn claims the benefit of Japanese Application No. 2007-159795, filed on Jun. 18, 2007, the disclosures of which applications are incorporated by reference herein.

TECHNICAL FIELD

The present invention relates to nonaqueous electrolyte secondary batteries such as lithium ion secondary batteries. In particular, it relates to improvement in safety of the nonaqueous electrolyte secondary batteries.

BACKGROUND ART

With recent trends toward portable and wireless electronic devices, there is increasing demand for small and lightweight nonaqueous electrolyte secondary batteries having high energy density, such as lithium ion secondary batteries, as a power source for these electronic devices.

In general, a nonaqueous electrolyte secondary battery includes a positive electrode, a negative electrode, a separator and a nonaqueous electrolyte. Each of the positive and negative electrodes is generally formed of a current collector and a material mixture layer containing an active material and a binder formed on the current collector. As the active material of the positive electrode, lithium composite oxides capable of reversibly causing an electrochemical reaction with lithium may be used. As the active material of the negative electrode, lithium metals, lithium alloys, carbons capable of inserting and extracting lithium ions may be used. The separator may be a film capable of supporting the nonaqueous electrolyte and electrically insulating the positive and negative electrodes. The nonaqueous electrolyte may be an aprotic organic solvent dissolving therein lithium salt such as $LiClO_4$, $LiPF_6$ or the like. The positive and negative electrodes are stacked or wound with the separator interposed therebetween to form an electrode group. The electrode group is placed in a battery case together with the nonaqueous electrolyte and the case is sealed with a lid. In this way, the nonaqueous electrolyte secondary battery is manufactured.

The nonaqueous electrolyte secondary battery easily generates heat when it is overcharged or an internal short circuit occurs in it. When the battery in a charged state is exposed to a high temperature environment, active oxygen is eliminated from the positive electrode active material (in particular, lithium composite oxide) and reacts with the nonaqueous electrolyte. Heat generated by the reaction accelerates the oxygen elimination from the positive electrode active material. This chain reaction is considered as a main cause of the heat generation of the battery. As the chain reaction continues, the separator is molten or shrunk to cause an internal short circuit between the positive and negative electrodes (or an internal short-circuited part is enlarged). As a result, large current flows between the electrodes, and therefore the battery is overheated and becomes instable.

In order to avoid this drawback, Patent Literature 1 discloses a method for suppressing the heat generation caused by the short circuit by increasing electrical resistance of the active material of the electrode. More specifically, lithium-cobalt composite oxide which shows a resistance coefficient of not less than 1 mΩ·cm and not more than 40 mΩ·cm when filling density thereof is 3.8 g/cm$^3$ is used as the positive electrode active material to suppress the heat generation in the short circuit.

However, according to this method, as the positive electrode active material is increased in resistance, the internal resistance is also increased. As a result, satisfactory power cannot be output, for example, in the case of a high power secondary battery generally used as a power source for driving an electric vehicle.

Patent Literature 2 discloses a method for suppressing the heat generation due to the short circuit with less increase in internal resistance. According to this method, a resistance layer having higher resistance than that of a current collector is formed on the surface of the current collector and an active material layer is formed on the resistance layer. More specifically, the resistance layer having a resistance value of 0.1-100 Ω·cm$^2$ is formed so as to prevent the large current flow even if an internal short circuit occurs.

[Patent Literature 1] Publication of Japanese Patent Application No. 2001-297763
[Patent Literature 2] Publication of Japanese Patent Application No 10-199574

DISCLOSURE OF THE INVENTION

Problem that the Invention is to Solve

Actually, according to the method of Patent Literature 2, a contact area between the resistance layer and the active material layer is so small in the internal short-circuited part. Therefore, the resistance value is high and the large current flow can be prevented. On the other hand, a contact area between the current collector and the active material layer is so large that the increase in internal resistance of the battery can be suppressed.

However, according to this method, the resistance layer is formed directly on the current collector and therefore hinders electron conduction throughout the electrode. As a result, the internal resistance is inevitably increased. In particular, increase in internal resistance in the electrode may significantly hinder increase in output power of the secondary battery.

As an approach to this problem, the present invention provides a highly safe nonaqueous electrolyte secondary battery capable of preventing overheat of the battery without impairing battery characteristics even if the battery generates heat due to overcharge or an internal short circuit.

Means of Solving the Problem

In order to solve the problem described above, the present invention provides a nonaqueous electrolyte secondary battery comprising a positive electrode, a negative electrode, a separator and a nonaqueous electrolyte, wherein a material mixture layer containing an active material and a binder is formed on a surface of a current collector of at least one of the positive electrode and the negative electrode, the material mixture layer includes a first layer and a second layer which are different in volume ratio of the binder to the active material, and the volume ratio (A) of the binder in the first layer in contact with the surface of the current collector is lower than the volume ratio (B) of the binder in the second layer.

The insulating binder concentrated in the second layer formed on the surface of the current collector, i.e., in a surface layer of the electrode, functions to increase the resistance between the positive and negative electrodes while it keeps the battery characteristics in the normal state. Even if the separator is partially lost due to overcharge of the battery or an internal short circuit, a large short circuit current is less likely to flow between the electrodes because the resistance between the electrodes has been increased.

The reason why the structure of the present invention makes it possible to keep the battery characteristics in the normal state is as follows. When a large amount of resistance (binder) is present near the current collector, electron conduction throughout the electrode is hindered. However, if a large amount of resistance is present in the surface layer of the electrode, the electron conduction is hindered only in the surface layer of the electrode.

Effect of the Invention

The present invention provides a highly safe nonaqueous electrolyte secondary battery having excellent battery characteristics.

EXPLANATION OF REFERENCE NUMERALS

| | |
|---|---|
| 1 | Battery case |
| 2 | Sealing plate |
| 3 | Gasket |
| 5 | Positive electrode |
| 5a | Positive electrode lead |
| 6 | Negative electrode |
| 6a | Negative electrode lead |
| 7 | Separator |
| 8a | Upper insulator |
| 8b | Lower insulator |
| 9 | Electrode group |
| 51 | Current collector |
| 52 | First layer |
| 53 | Second layer |

BEST MODE FOR CARRYING OUT THE INVENTION

Hereinafter, the present invention is explained in detail by way of an embodiment with reference to the drawings. The present invention is not limited to the following embodiment.

Figure 1:
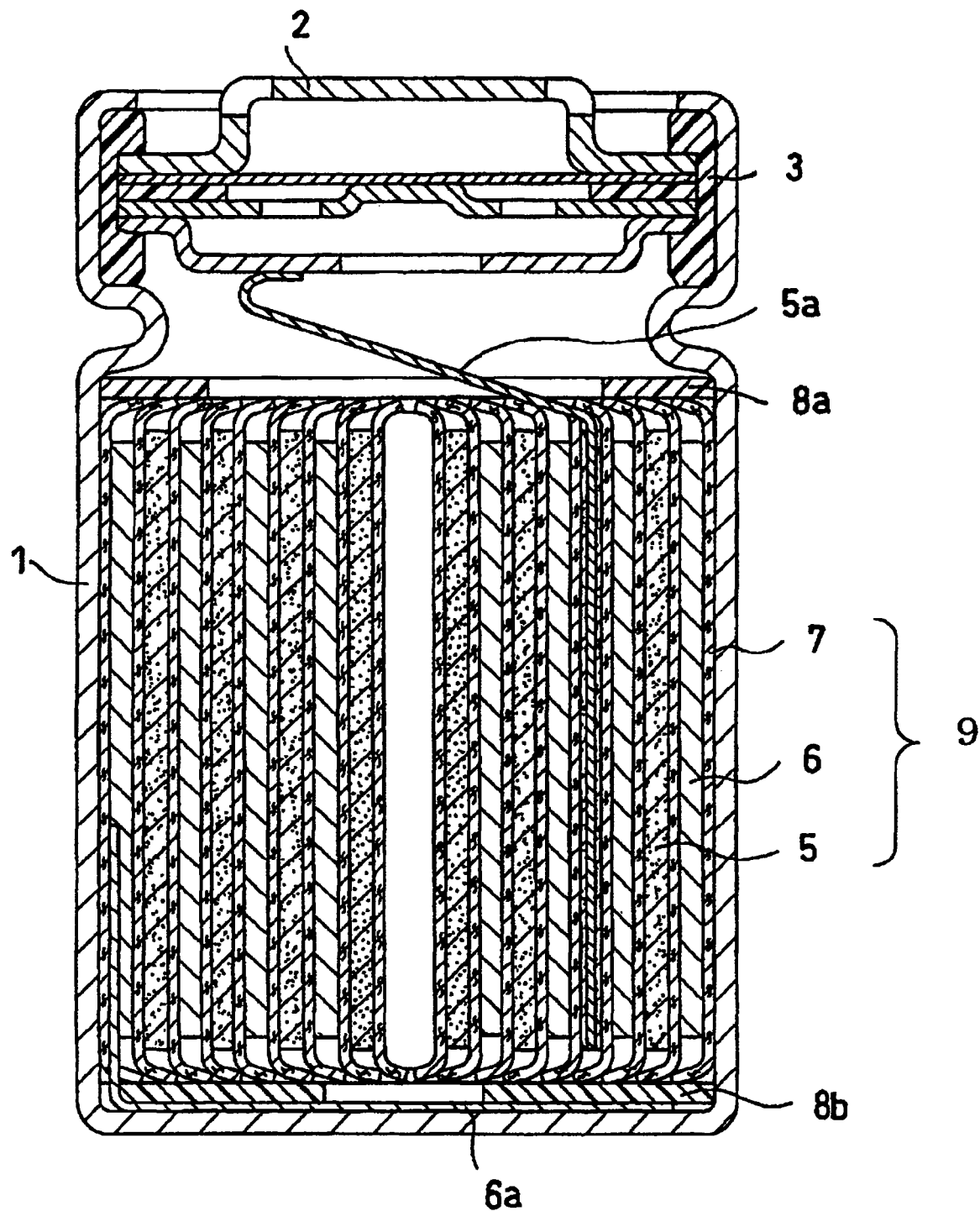
FIG. 1 is a sectional view illustrating the structure of a nonaqueous electrolyte secondary battery according to an embodiment of the present invention.
Figure 2:
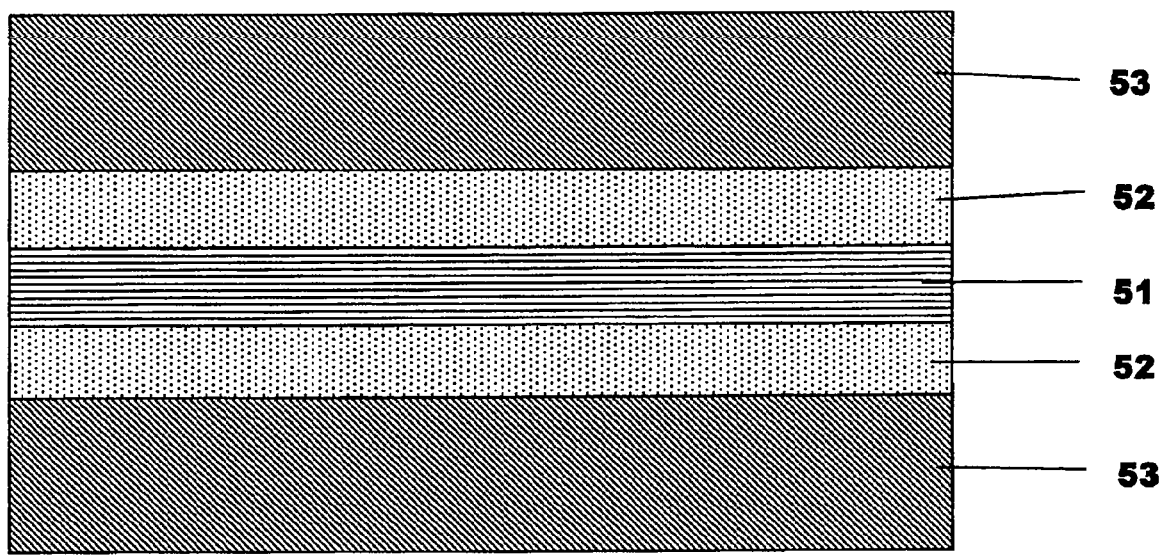
FIG. 2 is a sectional view illustrating the structure of an electrode according to the embodiment of the present invention.

FIG. 1 is a sectional view illustrating the structure of a nonaqueous electrolyte secondary battery according to an embodiment of the present invention. FIG. 2 is a sectional view illustrating the structure of an electrode according to the embodiment.

As shown in FIG. 1, the nonaqueous electrolyte secondary battery of the present embodiment includes a positive electrode 5, a negative electrode 6, a separator 7 and a nonaqueous electrolyte (not shown). Material mixture layers containing an active material and a binder are formed on the surfaces of a current collector of at least one of the positive and negative electrodes 5 and 6. Each of the active material layers includes, as shown in FIG. 2, a first layer 52 and a second layer 53 which are different in volume ratio of the binder to the active material. The volume ratio (A) of the binder in the first layer 52 in contact with the surface of the current collector 51 is lower than the volume ratio (B) of the binder in the second layer 53.

The structure of the nonaqueous electrolyte secondary battery of the present embodiment is explained below.

As shown in FIG. 1, an electrode group 9 formed by winding the positive electrode 5, the negative electrode 6 and the separator (e.g., made of polyethylene) 7 into a spiral form is placed in a battery case 1. An upper insulator 8a is arranged on the top of the electrode group 9, while a lower insulator 8b is arranged at the bottom of it. An end of a positive electrode lead 5a (e.g., made of aluminum) is attached to the positive electrode 5, while the other end is connected to a sealing plate 2 also serving as a positive electrode terminal. An end of a negative electrode lead 6a (e.g., made of nickel) is attached to the negative electrode 6, while the other end is connected to the battery case 1 also serving as a negative electrode terminal. An opening 1a at the top of the battery case 1 is sealed by the sealing plate 2 with a gasket 3 interposed therebetween.

The positive electrode 5 includes a current collector 51 and material mixture layers containing an active material (e.g., lithium composite oxide) and a binder. Each of the material mixture layers includes, as shown in FIG. 2, a first layer 52 in contact with the surface of the current collector 51 and a second layer 53 as a surface layer of the positive electrode 5. Provided that the volume ratio of the binder to the active material in the first layer 52 is A and the volume ratio of the binder to the active material in the second layer 53 is B, the binder volume ratios in the first and second layers 52 and 53 are controlled so that B/A>1 is satisfied.

The insulating binder concentrated in the surface regions of the positive electrode 5 (i.e., in the second layers 53) functions to increase resistance between the positive electrode 5 and the negative electrode 6, while it keeps battery characteristics in the normal state. Even if the separator 7 is partially lost due to overcharge of the battery or an internal short circuit, a large short circuit current is less likely to flow between the electrodes because the resistance between the positive and negative electrodes 5 and 6 has been increased. As a result, the battery is protected from abrupt temperature increase.

The reason why the structure of the present invention makes it possible to keep the battery characteristics in the normal state is as follows. When a large amount of the binder as a resistance is present near the current collector 51 (i.e., in the first layers 52), electron conduction throughout the positive electrode 5 is hindered. However, if a large amount of resistance is present in the second layers 535 the electron conduction is hindered only in the surface layers of the positive electrode 5.

According to the present invention, when the volume ratios of the binders in the layers 52 and 53 satisfy B/A>1, the advantage described above can be provided. In particular, the volume ratio A of the binder in the first layer is preferably set to not less than 2.4 vol % and less than 4.7 vol % and the volume ratio B of the binder in the second layer is preferably set to not less than 4.7 vol % and not more than 50 vol %. When the ratio A is less than 2.4 vol %, the material mixture layer is likely to come off the current collector. On the other hand, when the ratio is not less than 4.7 vol %, the internal resistance of the battery is increased and the battery characteristics are likely to deteriorate. Further, when the ratio B is less than 4.7 vol %, safety against the short circuit is not sufficiently enhanced. On the other hand, when the ratio B exceeds 50 vol %, the active material in the second layer 53 is electrically isolated and deteriorates discharge characteristics.

Preferably, the ratio B is set to not less than 10 vol % and not more than 30 vol %. With the ratio B not less than 10 vol %, safety against the short circuit can satisfactorily be improved. With the ratio not more than 30 vol %, a conductivity network in the second layer 53 is improved to enhance the discharge characteristics.

It is more preferable that the volume ratio B of the binder in the second layer 53 is 2.5 or more times higher than the volume ratio A of the binder in the first layer 52. With the ratios A and B set to satisfy $B/A \geq 2.5$, increase in internal resistance of the positive electrode 5 is suppressed in the normal state, and a resistance between the positive and negative electrodes 5 and 6 is increased when a short circuit occurs. As a result, the secondary battery is provided with high safety and excellent battery characteristics.

In general, a conductive agent (e.g., carbon black) is added to the positive electrode material mixture layer together with the binder for the purpose of increasing the conductivity of the positive electrode material mixture layer. Provided that the volume ratio of the conductive agent in the first layer 52 is C and the volume ratio of the conductive agent in the second layer 53 is D, the volume ratios C and D of the conductive agents are controlled to satisfy $D/C > 1$. In order to exhibit the advantage of the present invention in a balanced manner, both the binder and the conductive agent are preferably distributed unevenly. If the ratio D/C is not less than 1, the resistance between the positive and negative electrodes 5 and 6 cannot be sufficiently increased and the effect of preventing the battery from overheat is reduced.

According to the present invention, material for the binder is not particularly limited. However, polyvinylidene fluoride (hereinafter abbreviated as PVDF) is preferably used. PVDF is chemically stable at high voltage and high temperature and capable of giving adequate viscosity to precursor paste of the material mixture layer (the first and second layers 52 and 53). Therefore, use of PVDF makes it possible to achieve the present invention with efficiency.

An electrode of a nonaqueous electrolyte secondary battery according to the present invention can be manufactured by a general method. Specifically, first layers 52 containing an active material and a binder are formed on the surfaces of the current collector 51, and then second layers 53 containing the active material and the binder are formed on the surfaces of the first layers 52. The volume ratios of the binders in the first and second layers 52 and 53 are controlled so that the volume ratio (A) of the binder to the active material in each first layer 52 is lower than the volume ratio (B) of the binder to the active material in each second layer 53.

For example, when the first and second layers 52 and 53 are formed by application of material mixture paste, the first layers 52 may be applied and dried, and then the second layers 53 may be applied and dried. Alternatively, the first and second layers 52 and 53 may successively be applied and then dried simultaneously.

Further explanation of the present invention is described below.

Examples of the binder may include, in addition to PVDF described above, polytetrafluoroethylene, polyethylene, polypropylene, aramid resin, polyamide, polyimide, polyamide-imide, polyacrylonitrile, polyacrylic acid, methyl polyacrylate, ethyl polyacrylate, hexyl polyacrylate, polymethacrylic acid, polymethyl methacrylate, polyethyl methacrylate, polyhexyl methacrylate, polyvinyl acetate, polyvinyl pyrrolidone, polyether, polyether sulfone, hexafluoropolypropylene, styrene-butadiene rubber (SBR) and carboxymethyl cellulose (CMC). Further, a copolymer of two or more materials selected from tetrafluoroethylene, hexafluoroethylene, hexafluoropropylene, perfluoro(alkyl vinyl ether), vinylidene fluoride, chlorotrifluoroethylene, ethylene, propylene, pentafluoropropylene, fluoro(methyl vinyl ether), acrylic acid and hexadiene may also be used, as well as a mixture of them.

Examples of the active material of the positive electrode 5 may include $LiCoO_2$, $LiNiO_2$, $LiMnO_2$, $LiCoNiO_2$, $LiCoMO_2$, $LiNiMO_2$, $LiMn_2O_4$, $LiMnMO_4$, $LiMPO_4$ and $Li_2MPO_4F$ (M is at least one of Na, Mg, Sc, Y, Mn, Fe, Co, Ni, Cu, Zn, Al, Cr, Pb, Sb and B). An element in the active material may partially be substituted with a different element. The surface of the active material may be covered with metal oxide, lithium oxide and a conductive agent for hydrophobization.

Examples of the active material of the negative electrode 6 may include metals, metal fibers, carbon materials, oxides, nitrides, tin compounds, silicon compounds, various alloy materials and the like. Examples of the carbon materials include various natural graphites, coke, partially graphitized carbon, carbon fiber, spherical carbon, various artificial graphites and amorphous carbon. A single element such as Si or Sn, a silicon compound or a tin compound is preferably used as the active material of the negative electrode 6 because they have high volume density. Examples of the silicon compound may include $SiO_x$ ($0.05 < x < 1.95$), and silicon alloys, silicon compounds and silicon solid solutions in which Si is partially substituted with at least one element selected from the group consisting of B, Mg, Ni, Ti, Mo, Co, Ca, Cr, Cu, Fe, Mn, Nb, Ta, V, W, Zn, C, N and Sn. Examples of the tin compound may include $Ni_2Sn_4$, $Mg_2Sn$, $SnO_x$ ($0 < x < 2$), $SnO_2$ and $SnSiO_3$. The above-listed active materials may be used solely or two or more of them may be used in combination.

Examples of the conductive agent include graphites such as natural graphites and artificial graphites, carbon blacks such as acetylene black (AB), Ketjen black, channel black, furnace black, lampblack and thermal black, conductive fibers such as carbon fibers and metal fibers, carbon fluoride, metal powders such as aluminum, conductive whiskers such as zinc oxide and potassium titanate, conductive metal oxides such as titanium oxide, organic conductive materials such as phenylene derivatives. They are advantageously used as an additive to the positive electrode 5.

The current collector may be a porous or nonporous conductive substrate. An aluminum current collector is preferably used for the positive electrode 5, while a current collector made of stainless steel, nickel or copper is preferably used for the negative electrode 6. The thickness of the current collector is not particularly limited, but it may preferably be not less than 1 μm and not more than 500 μm, more preferably not less than 5 μm and not more than 20 μm. Within this range, the positive and negative electrodes 5 and 6 are reduced in weight without losing their strength.

As the separator 7 interposed between the positive and negative electrodes 5 and 6, a thin microporous film, woven fabric or nonwoven fabric having high ion permeability, certain mechanical strength and insulation properties may be used. Material for the separator 7 is preferably polyolefin such as polypropylene and polyethylene. Since polyolefin has high durability and shut-down effect, it can contribute to improvement in safety of the lithium ion secondary battery. The thickness of the separator 7 is generally not less than 10 μm and not more than 300 μm, preferably not less than 10 μm and not more than 40 μm, more preferably not less than 15 μm and not more than 30 μm, particularly preferably not less than 15 μm and not more than 25 μm. When the thin microporous film is used as the separator 7, it may be a single-layered film made of a single material, or a composite or multilayered film made of one or two or more materials. The porosity of the separator 7 is preferably not less than 30% and not more than 70%, more preferably not less than 35% and not more than 60%. The porosity is the volume ratio of pores to the whole volume of the separator 7.

As the nonaqueous electrolyte, a liquid nonaqueous electrolyte, a gelled nonaqueous electrolyte or a solid electrolyte (a polymer solid electrolyte) may be used.

The liquid nonaqueous electrolyte (a nonaqueous electrolyte solution) may be obtained by dissolving an electrolyte (e.g., lithium salt) in a nonaqueous solvent. The gelled nonaqueous electrolyte contains a nonaqueous electrolyte and a polymer material supporting the nonaqueous electrolyte. Examples of the polymer material may include PVDF, polyacrylonitrile, polyethylene oxide, polyvinyl chloride, polyacrylate and fluoride-hexafluoropropylene.

Any known nonaqueous solvent may be used to dissolve the electrolyte therein. For example, cyclic carbonate, open-chain carbonate and cyclic carboxylate may be used. Examples of cyclic carbonate may include propylene carbonate (PC) and ethylene carbonate (EC). Examples of open-chain carbonate may include diethyl carbonate (DEC), ethylmethyl carbonate (EMC) and dimethyl carbonate (DMC). Examples of cyclic carboxylate may include γ-butyrolactone (GBL) and γ-valerolactone (GVL). One of the nonaqueous solvents may be used solely or two or more of them may be used in combination.

Examples of the electrolyte to be dissolved in the nonaqueous solvent may include $LiClO_4$, $LiBF_4$, $LiPF_6$, $LiAlCl_4$, $LiSbF_6$, LiSCN, $LiCF_3SO_3$, $LiCF_3CO_2$, $LiAsF_6$, $LiB_{10}Cl_{10}$, lower aliphatic lithium carboxylate, LiCl, LiBr, LiI, chloroborane lithium, borates and imidates. Examples of borates may include bis(1,2-benzenediolate(2-)-O,O')lithium borate, bis(2,3-naphthalenediolate(2-)-O,O')lithium borate, bis(2,2'-biphenyldiolate (2-)-O,O')lithium borate and bis(5-fluoro-2-olate-1-benzenesulfonic acid-O,O')lithium borate. Examples of imidates may include lithium bis(trifluoromethanesulfonyl)imide (($CF_3SO_2)_2NLi$), lithium(trifluoromethanesulfonyl)(nonafluorobutanesulfonyl)imide ($LiN(CF_3SO_2)$ ($C_4F_9SO_2$)) and lithium bis(penthafluoroethanesulfonyl) imide (($C_2F_5SO_2)_2NLi$). One of the electrolytes may be used solely or two or more of them may be used in combination.

To the nonaqueous electrolyte solution, an additive which decomposes on the negative electrode 6 to form a coating having high lithium ion conductivity and capable of improving charge/discharge efficiency may be added. Examples of the additive having such a function may include vinylene carbonate (VC), 4-methylvinylene carbonate, 4,5-dimethylvinylene carbonate, 4-ethylvinylene carbonate, 4,5-diethylvinylene carbonate, 4-propylvinylene carbonate, 4,5-dipropylvinylene carbonate, 4-phenylvinylene carbonate, 4,5-diphenylvinylene carbonate, vinylethylene carbonate (VEC) and divinylethylene carbonate. One of the additives may be used solely or two or more of them may be used in combination. Among the above-listed additives, at least one additive selected from the group consisting of VC, VEC and divinylethylene carbonate is preferably used. A hydrogen atom in the additive may partially be substituted with a fluorine atom. The amount of the electrolyte dissolved in the nonaqueous solvent is preferably not less than 0.5 $mol/m^3$ and not less than 2 $mol/m^3$.

Further, to the nonaqueous electrolyte solution, a known benzene derivative may be added as another additive which decomposes when the battery is overcharged and forms a coating on the electrode to inactivate the battery. The benzene derivative may preferably have a phenyl group and a cyclic compound group adjacent to the phenyl group. Preferable examples of the cyclic compound group may include a phenyl group, a cyclic ether group, a cyclic ester group, a cycloalkyl group and a phenoxy group. Specific examples of the benzene derivative may be cyclohexylbenzene, biphenyl and diphenylether. One of the benzene derivatives may be used solely or two or more of them may be used in combination. The content of the benzene derivative is preferably not more than 10 vol % of the whole nonaqueous solvent.

Up to this point, the present invention has been described by way of a suitable embodiment. However, the above description is not limitative, and of course, various modifications may be possible. For example, the binder contained in the first and second layers 52 and 53 of the present invention may not be distributed evenly in the layers 52 and 53, but may be distributed to have a certain concentration gradient. Further, the binder may be distributed to have a continuous concentration gradient from the first layer 52 to the second layer 53.

According to the embodiment described above, the first and second layers 52 and 53 which are different in volume ratio of the binder to the active material are formed on the surfaces of the current collector 51 of the positive electrode 5. If the same first and second layers 52 and 53 are formed on the surfaces of the current collector of the negative electrode 6, the same effect can be obtained. Further, if the same first and second layers 52 and 53 are formed on one of the surfaces of the current collector 51, the effect of the present invention can be exhibited.

The shape of the nonaqueous electrolyte secondary battery of the present invention is not limited to that shown in FIG. 1. Specifically, the battery may be in the form of a rectangle cylinder. The electrode group 9 may be formed by stacking the positive and negative electrodes 5 and 6 with the separator 7 interposed therebetween.

EXAMPLES

Hereinafter, examples of the present invention are described to explain the structure and the effect of the present invention. The present invention is not limited to the following examples.

Example 1

Manufacture of Positive Electrode

To $LiNi_{0.82}Co_{0.15}Al_{0.03}O_2$ (an active material), 3.6 vol % of AB (a conductive agent) and 4 vol % of PVDF (a binder) dispersed or dissolved in N-methylpyrrolidone (NMP) were mixed to obtain paste. The paste was applied to both surfaces of a 15 μm thick current collector 51 made of aluminum and dried to form first layers 52.

Then, to the same active material as that used for the first layers 52, 1.9 vol % of AB (a conductive agent) and 15 vol % of PVDF (a binder) dispersed or dissolved in NMP were mixed to obtain paste. The paste was applied to both surfaces of the first layers 52 and dried to form second layers 53.

The conditions for the paste application were adjusted so that weight α of the active material in the first layer 52 and weight β of the active material in the second layer 53 satisfy α:β=9:1. The current collector 51 carrying the first layer 52 and the second layer 53 on each of its surfaces was rolled down to a thickness of 0.125 mm and cut into a dimension of 57 mm in width and 667 mm in length. Thus, the positive electrode 5 was obtained.

(Manufacture of Negative Electrode)

To flaky artificial graphite (an active material) prepared to have an average particle diameter of about 20 μm, 1.2 vol % of SBR (a binder) and 1.2 vol % of CMC (a binder) dispersed or dissolved in water were mixed to obtain paste. The paste was applied to the surfaces of a 8 μm thick current collector made of copper. The obtained product was dried, rolled and cut to obtain a negative electrode 6 of 0.156 mm in thickness, 58.5 mm in width and 750 mm in length.

(Preparation of Nonaqueous Electrolyte Solution)

To a solvent mixture of EC and DMC in the volume ratio of 1:3, 5 wt % of VC was added and $LiPF_6$ was dissolved therein in a concentration of 1.4 $mol/m^3$ to obtain a nonaqueous electrolyte solution.

(Manufacture of Cylindrical Battery)

The current collector was exposed at part of the positive electrode 5 and an aluminum positive electrode lead 5a was attached to the exposed part. In the same manner, the current collector was exposed at part of the negative electrode 6 and a nickel negative electrode lead 6a was attached to the exposed part. The positive electrode 5 and the negative electrode 6 were wounded with a polyethylene separator 7 interposed between to form an electrode group 9. Insulators were placed on the top and bottom of the electrode group 9, respectively. Then, the electrode group 9 was placed in a battery case 1 with the negative electrode lead 6a welded to the battery case 1 and the positive electrode lead 5a welded to a sealing plate 2 having an internal pressure-activated safety valve. Then, the nonaqueous electrolyte solution was injected into the battery case 1 and an opening of the battery case 1 was crimped onto the sealing plate 2 with a gasket 3 interposed therebetween. Thus, a nonaqueous electrolyte secondary battery of Example 1 was obtained.

Examples 2-4

Nonaqueous electrolyte secondary batteries of Examples 2-4 were manufactured in the same manner as Example 1 except that the amount of PVDF in the first layer of the positive electrode was varied to 2.4 vol % (Example 2), 4.6 vol % (Example 3) and 2 vol %, (Example 4) with respect to the amount of the active material.

Examples 5-10

Nonaqueous electrolyte secondary batteries of Examples 5-10 were manufactured in the same manner as Example 1 except that the amount of PVDF in the second layer of the positive electrode was varied to 10 vol % (Example 5), 50 vol % (Example 6), 35 vol % (Example 7), 30 vol % (Example 8), 4.7 vol % (Example 9) and 60 vol % (Example 10) with respect to the amount of the active material.

Example 11

Nonaqueous electrolyte secondary battery of Example 11 was manufactured in the same manner as Example 1 except that the amount of AB in the first layer of the positive electrode was varied to 1.9 vol % with respect to the amount of the active material and the amount of AB in the second layer was varied to 3.6 vol % with respect to the active material.

Comparative Examples 1-3

Nonaqueous electrolyte secondary batteries of Comparative Examples 1-3 were manufactured in the same manner as Example 1 except that the amount of PVDF in the second layer of the positive electrode was varied to 4 vol % (Comparative Example 1), 6 vol % (Comparative Example 2) and 8 vol % (Comparative Example 3).

The thus-formed batteries were evaluated in the following manner. Table 1 shows the results.

(Internal Resistance)

The batteries were charged at a constant current of 1.4 A to 4.2 V in a 25° C. environment and then charged again at a constant voltage of 4.2 V to a current value of 50 mA. The internal resistance was then measured at a frequency of 1 kHz.

(Battery Capacity)

The batteries were charged at a constant current of 1.4 A to 4.2 V in a 25° C. environment and then charged again at a constant voltage of 4.2 V to a current value of 50 mA. Then, the batteries were discharged at a constant current of 580 mA to 2.5 V. Thereafter, the battery capacity was measured.

(Nail Penetration Test)

A nail penetration test was performed in the following manner to check safety. The batteries were charged at a constant current of 1.45 A to 4.25 V in a 25° C. environment and then charged at a constant voltage of 4.25 V to a current value of 50 mA. Subsequently, a nail of 2.7 mm in diameter was allowed to penetrate the center of the battery at 5 mm/sec in a 60° C. environment. The number of batteries that were overheated to 100° C. and smoked was count.

TABLE 1

| | Binder in $1^{st}$ layer (vol %) | Binder in $2^{nd}$ layer (vol %) | Conductive agent in $1^{st}$ layer (vol %) | Conductive agent in $2^{nd}$ layer (vol %) | Number of smoked battery | Internal resistance (mΩ) | Battery capacity (Ah) |
|---|---|---|---|---|---|---|---|
| Ex. 1 | 4 | 15 | 3.6 | 1.9 | 0/5 | 40 | 2.9 |
| Ex. 2 | 2.4 | 15 | 3.6 | 1.9 | 0/5 | 39 | 2.9 |
| Ex. 3 | 4.6 | 15 | 3.6 | 1.9 | 0/5 | 40 | 2.9 |
| Ex. 4 | 2 | 15 | 3.6 | 1.9 | 0/5 | 39 | 2.9 |
| Ex. 5 | 4 | 10 | 3.6 | 1.9 | 0/5 | 40 | 2.9 |
| Ex. 6 | 4 | 50 | 3.6 | 1.9 | 0/5 | 40 | 2.8 |
| Ex. 7 | 4 | 35 | 3.6 | 1.9 | 0/5 | 40 | 2.85 |
| Ex. 8 | 4 | 30 | 3.6 | 1.9 | 0/5 | 40 | 2.9 |
| Ex. 9 | 4 | 4.7 | 3.6 | 1.9 | 1/5 | 40 | 2.9 |
| Ex. 10 | 4 | 60 | 3.6 | 1.9 | 0/5 | 40 | 2.6 |
| Ex. 11 | 4 | 15 | 1.9 | 3.6 | 2/5 | 46 | 2.9 |
| Com. Ex. 1 | 4 | 4 | 3.6 | 1.9 | 5/5 | 40 | 2.9 |
| Com. Ex. 2 | 4 | 6 | 3.6 | 1.9 | 5/5 | 40 | 2.9 |
| Com. Ex. 3 | 4 | 8 | 3.6 | 1.9 | 4/5 | 40 | 2.9 |

All the batteries of Comparative Examples 1-3 in which the volume ratio B of the binder in the second layer was 2.0 or less times higher than the volume ratio A of the binder in the first layer were overheated to 100° C. as a result of the nail penetration test. In contrast, the batteries of Examples 1-11 according to the present invention showed better results in the nail penetration test as compared with the batteries of Comparative Examples 1-3.

The battery of Example 10 in which the volume ratio B of the binder in the second layer exceeded 50 vol % reduced the battery capacity. In comparison with the batteries of other examples, it is considered that the volume ratio B in the second layer is preferably set to not less than 4.7 vol % and not more than 50 vol %, more preferably not less than 10 vol % and not more than 30 vol %. Further, it is preferable that the volume ratio B of the binder in the second layer is 2.5 or more times higher than the volume ratio A of the binder in the first layer.

The batteries of Example 11 in which the amount of the conductive agent was larger in the second layer than in the first layer slightly increased the internal resistance. This indicates that the volume ratio C of the conductive agent in the first layer and the volume ratio D of the conductive agent in the second layer are preferably adjusted to satisfy D/C<1.

The batteries of Example 4 showed good results in each evaluation. However, due to reduction in adhesion between the current collector and the first layer, the material mixture layer was partially peeled off. In view of mass production of the nonaqueous electrolyte secondary battery, the volume ratio A of the binder to the active material in the first layer is preferably set to not less than 2.4 vol %.

INDUSTRIAL APPLICABILITY

The nonaqueous electrolyte secondary battery of the present invention is reduced in size and weight and has high energy density, and therefore highly available as a power source for driving electronic devices.

The invention claimed is:

1. A nonaqueous electrolyte secondary battery comprising a positive electrode, a negative electrode, a separator and a nonaqueous electrolyte, wherein
    a material mixture layer containing an active material and a binder is formed on a surface of a current collector of at least one of the positive electrode and the negative electrode,
    the material mixture layer includes a first layer and a second layer which are different in volume ratio of the binder to the active material,
    the volume ratio (A) of the binder in the first layer which is in contact with a surface of the current collector is not less than 2.4 vol % and less than 4.7 vol % and the volume ratio (B) of the binder in the second layer is not less than 4.7 vol % and not more than 50 vol %, and
    the volume ratio (B) of the binder in the second layer is 2.5 or more times higher than the volume ratio (A) of the binder in the first layer.

2. The nonaqueous electrolyte secondary battery of claim 1, wherein the volume ratio (B) of the binder in the second layer is not less than 10 vol % and not more than 30 vol %.

3. The nonaqueous electrolyte secondary battery of claim 1, wherein the material mixture layer further contains a conductive agent, and
    a volume ratio (C) of the conductive agent to the active material in the first layer is higher than a volume ratio (D) of the conductive agent to the active material in the second layer.

4. The nonaqueous electrolyte secondary battery of claim 1, wherein
    the binder comprises polyvinylidene fluoride.

5. A method for manufacturing an electrode of a nonaqueous electrolyte secondary battery including a current collector and a material mixture layer containing an active material and a binder and formed on a surface of the current collector, the method comprising the steps of:
    forming a first layer containing the active material and the binder on the surface of the current collector; and
    forming a second layer containing the active material and the binder on the surface of the first layer, wherein
    a volume ratio (A) of the binder to the active material in the first layer which is in contact with the surface of the current collector is not less than 2.4 vol % and less than 4.7 vol % and a volume ratio (B) of the binder to the active material in the second layer is not less than 4.7 vol % and not more than 50 vol % and
    the volume ratio (B) of the binder in the second layer is 2.5 or more times higher than the volume ratio (A) of the binder in the first layer.

* * * * *